United States Patent

Erbert et al.

[11] 4,068,952
[45] Jan. 17, 1978

[54] RANGE TESTING SYSTEM HAVING SIMULATED OPTICAL TARGETS

[75] Inventors: Virgil Erbert, Albuquerque, N. Mex.; Leroy O. Braun, Marina Del Rey, Calif.

[73] Assignee: Hughes Aircraft Company, Culver City, Calif.

[21] Appl. No.: 708,168

[22] Filed: July 23, 1976

[51] Int. Cl.² ............................................. G01C 3/08
[52] U.S. Cl. ............................................ 356/5; 73/5; 73/432 SD; 350/96 C
[58] Field of Search ............ 73/5, 432 SD; 350/96 C; 356/5

[56] References Cited

U.S. PATENT DOCUMENTS

| | | | |
|---|---|---|---|
| 3,428,815 | 2/1969 | Thompson | 356/5 |
| 3,526,880 | 9/1970 | Filippazzi | 350/96 C |
| 3,870,396 | 3/1975 | Racki et al. | 350/96 C |
| 3,900,261 | 8/1975 | Wingate | 356/5 |
| 3,914,052 | 10/1975 | Wiklund | 356/5 |
| 3,981,592 | 9/1976 | Williams | 350/96 C |

Primary Examiner—S. C. Buczinski
Attorney, Agent, or Firm—W. H. MacAllister; Walter J. Adam

[57] ABSTRACT

A fiber optic device to produce either single or multiple delayed light pulses from a single input light pulse for testing of a range determining unit such as a laser range finder. The optical range tester includes a coil of an optical waveguide such as a single optical fiber, input and output focusing lenses and a multiple tapping unit for extracting or sampling light energy from the fiber at a number of predetermined points along the coil to provide different time delays. All of the sampled output beams are combined optically so that they leave the device on a common optical axis so as to be sensed by an optical detector in the laser receiver. The optical range tester in accordance with the invention, may be utilized either as a portable unit or as a built-in test unit. The range tester may provide a minimum range return, a nominal return and a range resolution return and may include extinction filters to allow a determination of effective transmitter to receiver gain. For the range tester utilized as a portable unit, internal optical stimulus may be provided to allow the range finder receiver optics to be bore sighted to the optical output of the range tester.

8 Claims, 10 Drawing Figures

RANGE TESTING SYSTEM HAVING SIMULATED OPTICAL TARGETS

BACKGROUND OF THE INVENTION

1. Field of the Invention

This invention relates to a device for testing optical range finders and particularly to a simulated optical range target unit utilizing fiber optics or optical waveguides to produce multiple delayed light pulses from a single input light pulse.

2. Description of the Prior Art

Conventionally laser range finders have been tested in outdoor target ranges which are generally inconvenient for moving the equipment to the range, may provide a danger to personnel as a result of accidental exposure to the laser beam and are subject to the variations of optical transmissivity caused by moisture, dust and other pollutants.

A laser range finder test unit that can be brought to the laser itself, that eliminates any chances of exposure of personnel to the laser beam and that provides constant test characteristics would be a substantial advantage to the art. Also a laser range finder test unit having constant and reliable characteristics that could be utilized as a built-in test unit would be highly useful in the art.

It is therefore an object of this invention to provide a fiber optic device to produce multiple delayed light pulses of a single input light pulse.

It is another object of this invention to provide a simulated optical range target device that has consistent and constant transmission characteristics.

It is a further object of this invention to provide an optical range test unit for optical or laser range finders that not only tests for range but also determines effective transmitter to receiver gain.

It is a still further object of this invention to provide an optical range test unit for optical or laser range finders that has the feature of allowing it to be aligned with the laser range finder.

It is yet a further object of this invention to provide a built-in test unit for optical or laser range finders.

BRIEF DESCRIPTION OF THE DRAWINGS

The novel features of this invention as well as the invention itself, both as to its method of organization and method of operation, will best be understood from the accompanying description, taken in connection with accompanying drawings, in which like referenced characters refer to like parts and in which.

DESCRIPTION OF THE PREFERRED EMBODIMENT

Figure 1:
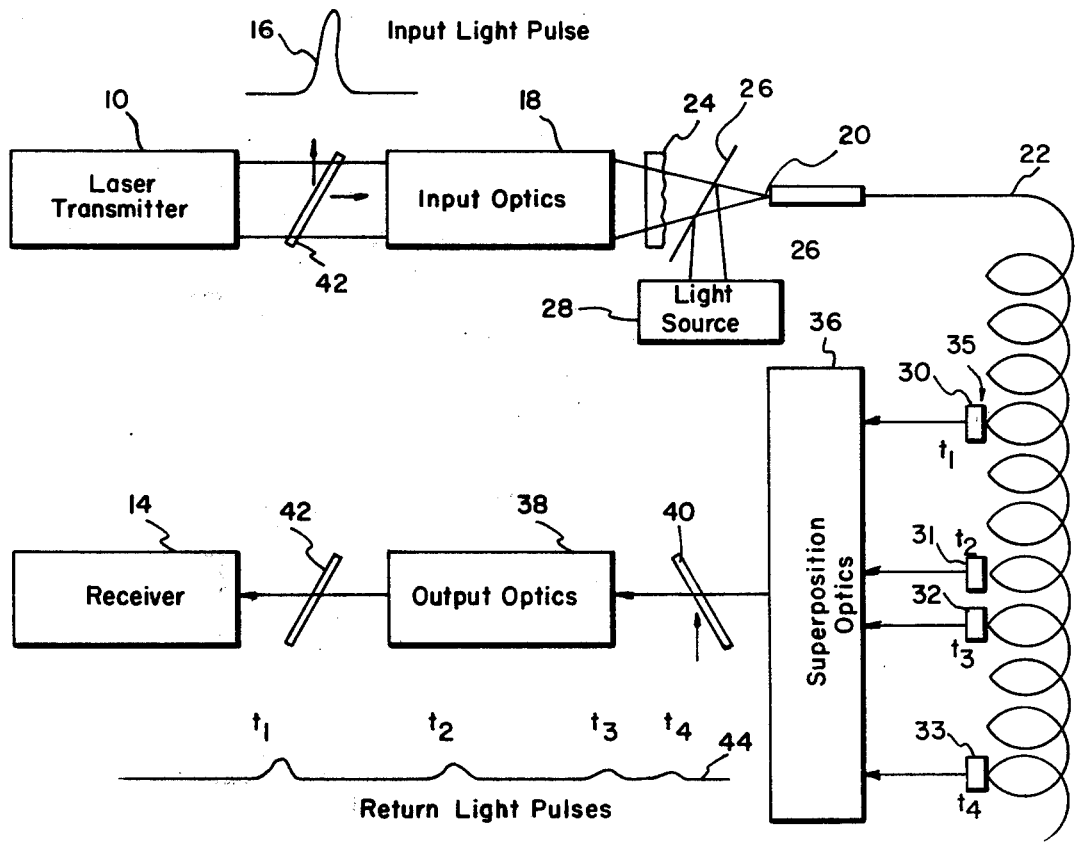
FIG. 1 is a schematic diagram of the optical simulated range tester in accordance with the invention that may be utilized either as the portable test unit or as a built-in test unit.

Referring first to FIG. 1, the optical range tester operates with an optical range finder such as a laser range finder including a laser transmitter 10 and a receiver 14. A transmitted pulse of signal energy shown by waveform 16 is applied from the transmitter 10 to an input optic unit 18 where the beam is passed as a converging beam to an input 20 of a single optical fiber or optical waveguide 22 which may be a conventional glass optical fiber containing a step or a graded change in the refractive index of the glass between the core and the outer region such that light propagated along the fiber is guided in the core region of the fiber. For the purposes of this invention an optical fiber is to mean any optical waveguide glass fiber or fiber of any suitable material that will propagate signal energy along its length, and light or light energy means energy at any frequency such as in the optical, infrared region or higher frequency region that can be propagated through the optical fiber as defined. In order to reduce the energy level applied to the input 20 so as to not damage the optical fiber, a diffuser 24 is positioned in the beam passing out of the input optic unit 18.

Also in this beam, a dichroic mirror 26 transmitting a substantial portion of its energy to the input 20 is provided with a light source 28 for aligning the receiver optics with the laser receiver 14. A multiple tap unit 35 having tap units 30 to 33 are provided along the delay line 22 for sensing four target returns as an illustration of the concept of the invention. The four target returns for example may be a minimum range return, a nominal 500 meter return, a range resolution test return such as 480 meters, and an extended range return. All output images derived from the tapping units 30 to 33 are super positioned in a sampling and super position optic unit 36 and applied through an output optic unit 38 to the receiver 14. As an alternate arrangement for bore sighting, a semi-reflective mirror 40 may be included in the optical path at the output of the unit 36. The mirror 40 may include a dichroic mirror as is well known in the art. To illustrate that the range tester in accordance with the invention may be utilized as a built-in test unit, a single semi-reflective mirror 42 which would normally be a single dichroic mirror, is shown at the output of the laser transmitter 10 and the input of the receiver 14. The pulses of a waveform 44 show the simulated range return pulses for the four illustrated ranges, the pulses having a decreasing energy level at the greater ranges.

Figure 2:
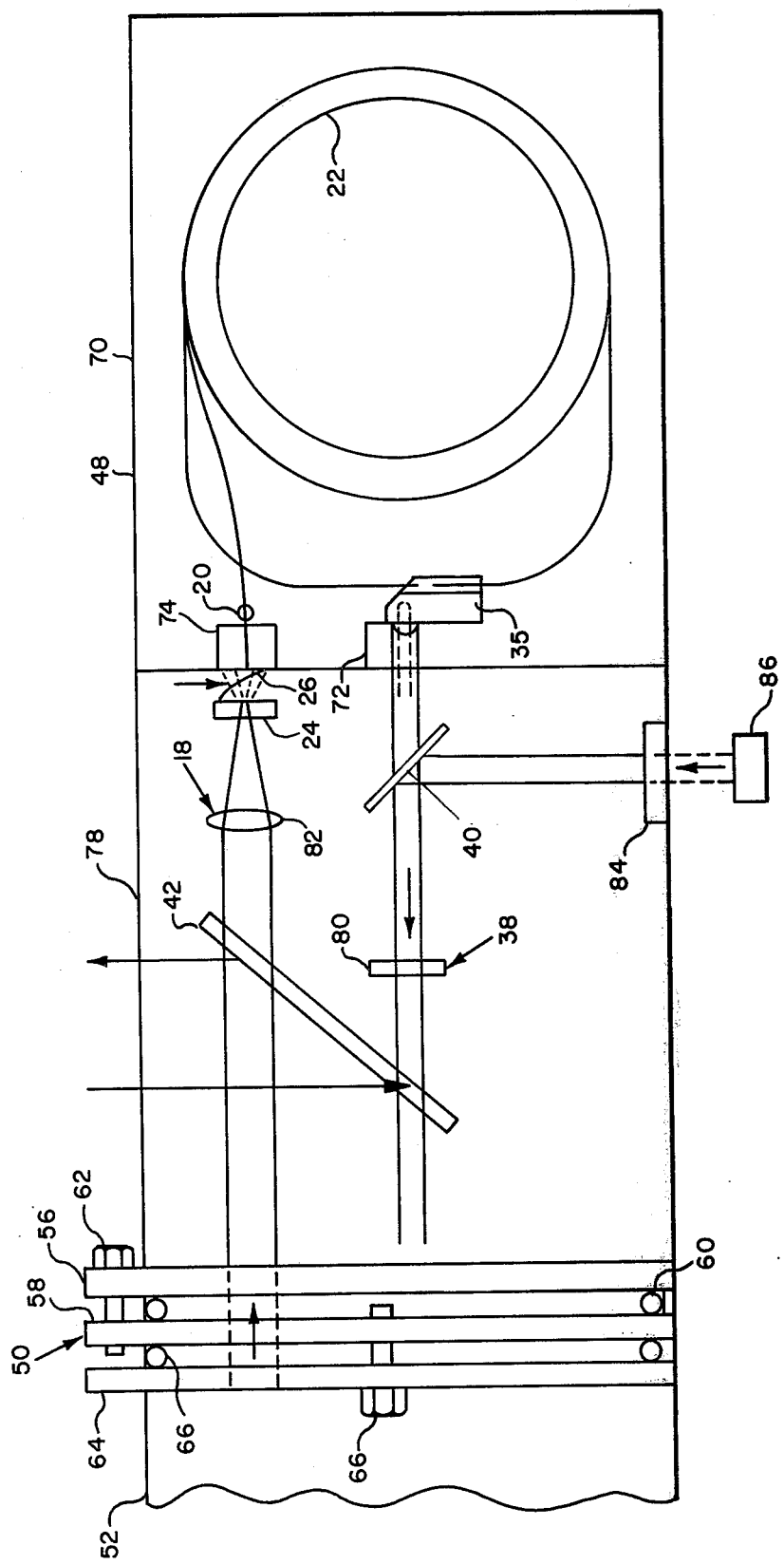
FIG. 2 is a schematic top view of the optical simulated range test unit of FIG. 1 showing further detail and arrangement of the components and being especially applicable as a portable test unit.

Referring now to FIG. 2, which is a schematic optical layout of the range tester of FIG. 1 as a unit 48 which may be mounted through a mechanical adapter 50 to a laser ranger unit 52 including the transmitter 10 and the receiver 14 of FIG. 1. The mechanical adapter 50 that is used in a portable test unit is suitably mounted to the structure of the laser ranger 52 such as by bolts (not shown). Any suitable type of mechanical adapter capable of angular alignment in two dimensions may be utilized and the illustrated adapter has first and second plates 56 and 58 separated by a resilient ring 60 such as a rubber ring and adjusted in a first dimension by a bolt 62. A plate 64 separated from the plate 58 by a resilient ring 66 which may also be a rubber ring, provides the adjustment in the second dimension by tightening or loosening a suitable bolt 66. In the illustrated arrangement, a sealed and potted delay unit 70 includes the optical fiber coils 22, optical windows 72 and 74 and the multiple tap unit 35 adjacent to the optical window 72. The output optic unit 38 of an optical section 78 may include either fixed or variable neutral density filters 80 to allow determination of effective transmitter to receiver gain. The dichroic mirror 42 is shown as a single mirror for transmitting and receiving energy toward the target in a single path when the test unit in accordance with the invention, is utilized as a built-in test unit. The input optics unit 18 contains an insertion lens 82 which focuses the laser light from the transmitter onto the diffusing screen 24. An input window 84 receiving light from a suitable source 86 illuminates the fiber ends after reflection off of semi-reflective mirror 40 for aligning the receiver of the range finder 52 to the test unit. The semi-reflective mirror 26 is shown to illustrate that alignment may be provided with that mirror rather than with mirror 40.

For use with an optical ranger such as a laser ranger, having a common optical path for transmitting and receiving, the common path may include a beam splitter receiving the transmitted energy and passing it therethrough to the test system of the invention with the output from the range tester applied to a mirror positioned to reflect the energy to the beam splitter and through the common optical path to the laser ranger.

Figure 5A:
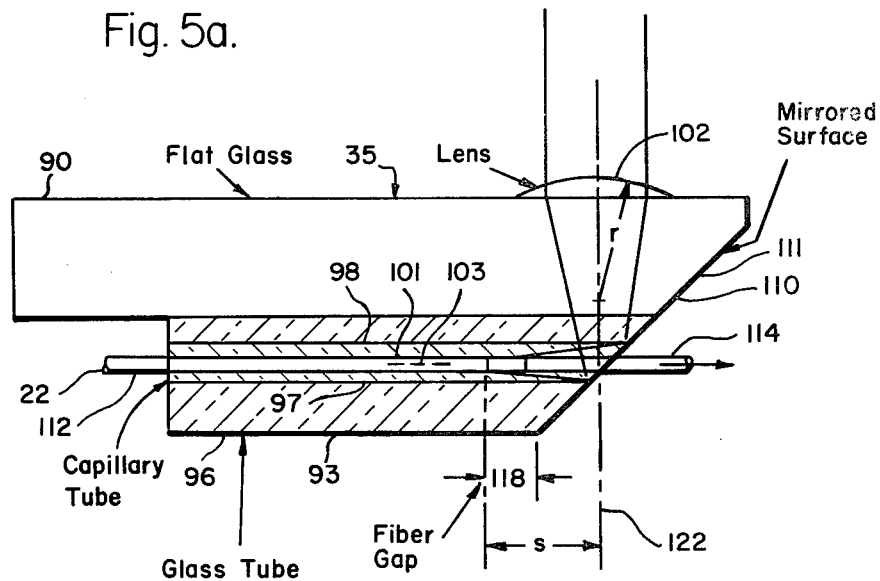
FIGS. 5a and 5b are respectively a schematic sectional view taken at lines 5—5 of FIG. 4 and an end view of the tapping structure of FIG. 5a for further explaining the sampling structures of the multiple tap unit, each sampling structure being similar to that shown in FIGS. 5a and 5b.
Figure 5B:
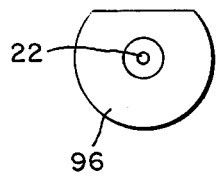
Figure 4:
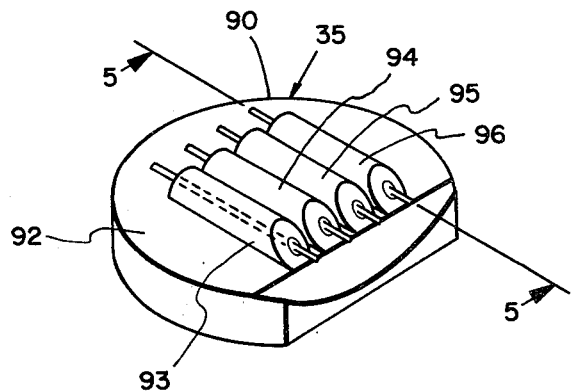
FIGS. 3 and 4 are perspective top and bottom views of a multiple tap unit that may be utilized with the systems of FIGS. 1 and 2.
Figure 3:
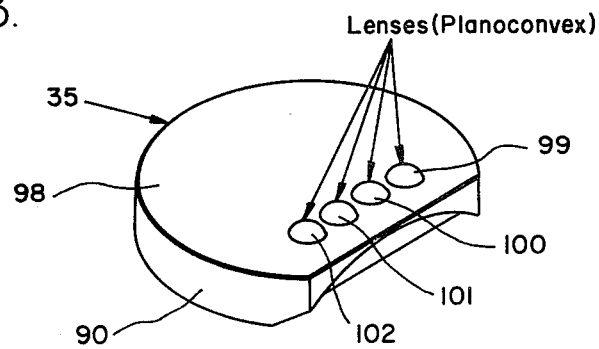

Referring now to FIGS. 3 and 5 the multiple tapping unit 35 utilized in the system of the invention may be formed from an optical flat or structure 90 having fixed on a first flat side at 92, four tapping assemblies 93 to 96 and fixed on a second flat side 98, four lenses 99 to 102 which may be plano-convex lenses for example. As shown in the section of FIG. 5a and the end view of FIG. 5b each tapping unit such as 93 is formed from a glass rod which may be a circular rod with a hole drilled therethrough to form a glass tube. For the purposes of this invention it is to be understood that the term glass rod includes any suitable glass or suitable transmission material such as a semiconductor material of an elongated configuration. If a semiconductor material is utilized for the glass rod, the ramainder of the structure including the capillary tube and the optical flat may be of a similar material. A capillary tube 98 is mounted in the opening 97 along an axis 103 being drawn with a center opening 101 slightly larger than the outer diameter of the optical fiber 22. It is to be noted that the principles of the invention include utilizing a single optical structure with a hole therethrough for receiving the optical fiber 22, the capillary tube shown simplifying the formation of the structure having an opening of desired diameter. The surfaces 110 of the glass tube 96 and the capillary tube 98 are ground and polished flat to a desired angle $\theta$ relative to the axis of the capillary tube 98, the surface 110 also including the structural optical flat 90 although the ground surface of the optical flat may not be functional. A reflective material 111 such as aluminum or silver is deposited on the surface 110. The optical fiber 22 has an input portion 112 positioned in the capillary opening 101 to a point P and a second fiber optical fiber portion 114 positioned in the capillary opening 101 to provide a gap 118 of a selected length along the axis. Energy from the end of the optical line 112 at point P has been found to diffuse at approximately a 5° to 6° angle relative to the axis 103 in the shape of a cone, which energy is then reflected from the mirror surface 110. The angle of the diffusion cone is principally a function of the index of refraction of the core of the fiber relative to the index of refraction of the outer circumferential portion of the fiber. The dimension S is selected from the point P to the point where the axis 103 crosses the reflective mirror surface and the axis 122 is then the center axis of lens 102. Although the lens 102 may not be always utilized, it lessens distortion of the cone of optical rays applied thereto from the reflective surface 110. The point P is the focal point of the lens 102 for all points on a diameter of the flat glass. It is to be noted that if the fiber optic line 22 has an outer protective coating, this shield may be removed before insertion into the capillary tube opening 101.

The control gap 118 may be adjusted during assembly to tap or sample any desired amount of energy for reflection from the mirrored surface 110. A suitable index matching cement such as Canada Balsam having an index of refraction similar to the optical line may be placed in the control gap 118 to prevent reflections and to bond the coupler to the fibers. It is to be noted that the adjustment may not necessarily be the same for each of the illustrated four samplers but may be varied by a suitable selection of the control gap. In order to illustrate the variation of energy that may be sampled as a function of the length of the control gap 118, tests were made of the energy from a laser passed through a 5.55 inch fiber, a control gap and into a 10 inch fiber which was then applied to an EG&G model 580 radiometer instrument. Measurements were then made to obtain the light throughput with the injection optimized at the laser end and with the measurements being made with different gap lengths. The ampere readings of the throughput energy were as follows and show that a wide variation of throughput and sampling may be obtained by varying the gap spacing.

| Separation | Amperes |
| --- | --- |
| .000 | $1.80 \times 10^{-7}$ |
| .002 | $1.77 \times 10^{-7}$ |
| .004 | $1.75 \times 10^{-7}$ |
| .005 | $1.73 \times 10^{-7}$ |
| .006 | $1.70 \times 10^{-7}$ |
| .007 | $1.7 \times 10^{-7}$ |
| .008 | $1.67 \times 10^{-7}$ |
| .009 | $1.67 \times 10^{-7}$ |
| .010 | $1.63 \times 10^{-7}$ |
| .011 | $1.58 \times 10^{-7}$ |
| .012 | $1.57 \times 10^{-7}$ |
| .013 | $1.52 \times 10^{-7}$ |
| .014 | $1.53 \times 10^{-7}$ |
| .015 | $1.55 \times 10^{-7}$ |
| .016 | $1.49 \times 10^{-7}$ |
| .000 | $1.8 \times 10^{-7}$ |

The 1.80 × 10⁻⁷ amperes reading represented a loss of 7.27 db with the fibers in contact. The variation of the ampere readings represent a combined loss from the control gap and the fiber optic line.

The gap 118 is selected to allow a desired amount of light energy to be sampled, the remainder being applied to the receiving end of the fiber optic line 114. With the gap 118 being the tap spacing and F being the fraction of the light tapped off, for 0.005 inch diameter fiber optic lines, the following approximate fractions have been calculated:

| g inches | F |
| --- | --- |
| .001 | .08 |
| .002 | .17 |
| .003 | .26 |
| .004 | .35 |
| .005 | .45 |
| .006 | .55 |
| .010 | .99 |

Thus, it can be seen that substantially any percentage of the energy can be controllably sampled by the arrangement in accordance with the invention.

Figure 6:
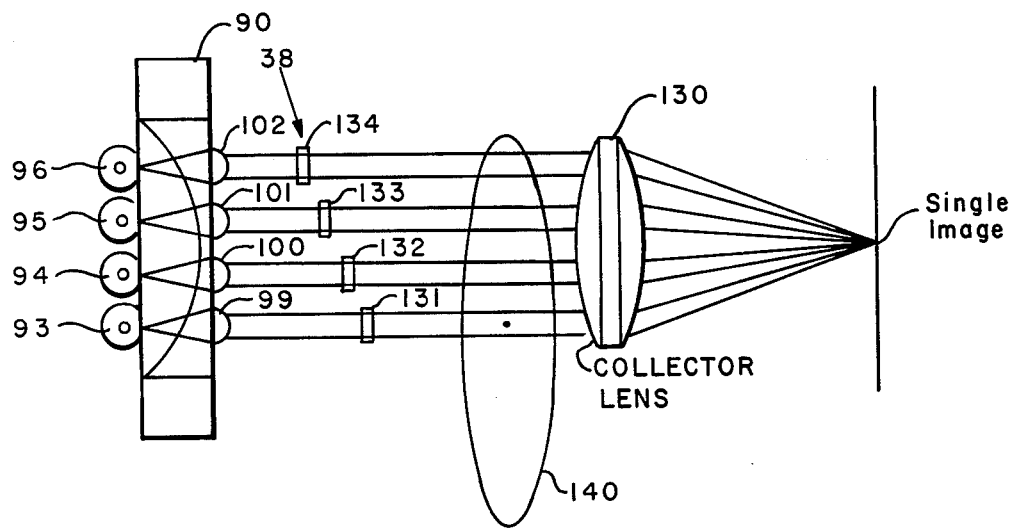
FIG. 6 is a schematic top view of the multiple tap unit for explaining the image super positioning optics in accordance with the invention.

Referring now to FIG. 6, the image super positioning optics will be explained in further detail. As can be seen, the result of the multiple sampling unit provides the light rays in a single beam which may then be applied to a collector lens 130 focused at a single image point within the laser receiver for being detected. It is to be noted that in some arrangements, the collector lens 130 may be included in the laser receiver itself. The neutral density filter unit 38 may include neutral density filters 131 through 134 which may be included in the optical paths from respective lenses 99 to 102 in which arrangement they have a fixed value once installed in the test unit. Also within the scope of the invention, a neutral density filter 140 of variable value as a function of the angular position thereof may be utilized for providing a variable attenuation. These type of variable density attenuators are well known in the art, such as in the unit available from Ealing Corp., P/N 22-8981.

Figure 8:
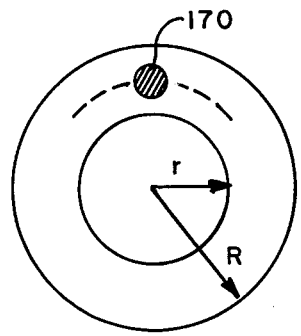
FIG. 8 is a schematic sectional view through an optical fiber or waveguide for further explaining the alignment of the test unit with a receiver of a laser range finder in accordance with the invention.
Figure 7:
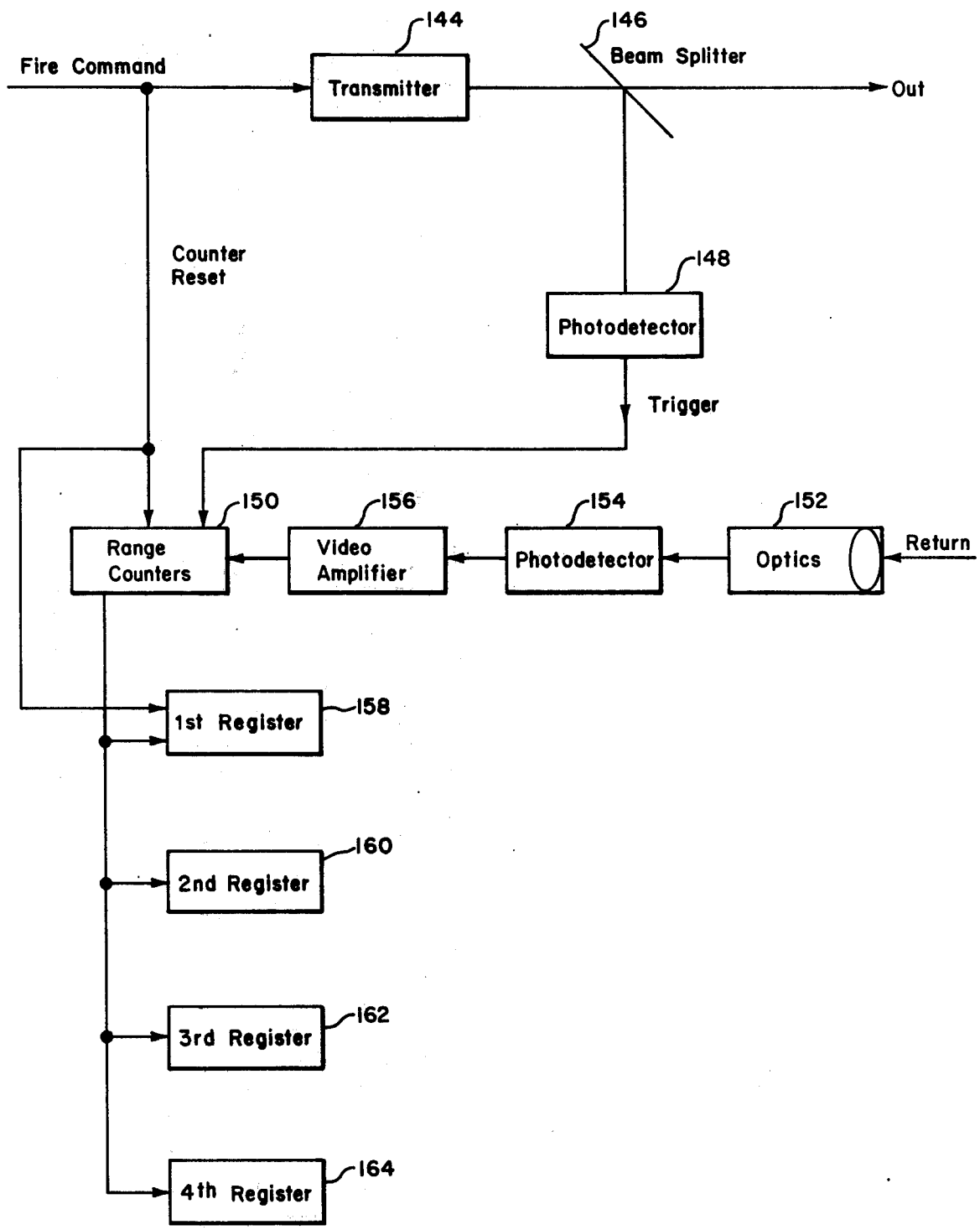
FIG. 7 is a schematic block diagram showing an example of a laser range finder for further explaining the operation of the system in accordance with the invention.

For explaining the operation of the range test unit in a typical laser ranger, reference is now made to FIG. 7 which shows a transmitter 144 triggered in response to a fire command signal so as to apply an energy pulse to a beam splitter 146 and out toward the target or to the range test unit in accordance to the invention. A portion of the energy from the beam splitter 146 is applied to a photo detector 148 which provides a trigger signal to a range counter unit 150, being initially reset by the fire command signal. Return energy from either a target or from the range tester of the invention is applied to an optical unit 152, a photodetector 154 and a video amplifier 156 which in turn applies a signal to the range counter 150 for transferring the range count to the first register 158. The subsequent four test signals are applied to registers 160, 162 or 164; each register having suitable control circuitry to apply the next range return to the subsequent register. Each register may be reset by the counter reset signal or the fire command signal when desired. If this type of a register arrangement is utilized with a built-in test unit, suitable circuitry may be provided in the range counter 150 for gating out the test return such as at the output of the photodetector 148 when it is desired to operate only in the ranging mode without the test mode. When aligning the range test unit with the dichroic mirror 40 of FIG. 2, a dot or marker in the laser receiver is viewed on the end of the fiber as shown by a dot 170 of FIG. 8, this dot being the normal field of view of the receiver. By looking through the laser receiver a person is thus able to properly align the ring pattern by changing the setting of the mechanical adapter 50. The alignment consists of centering field stop 170 in the outer ring between radii r and R.

Figure 9:
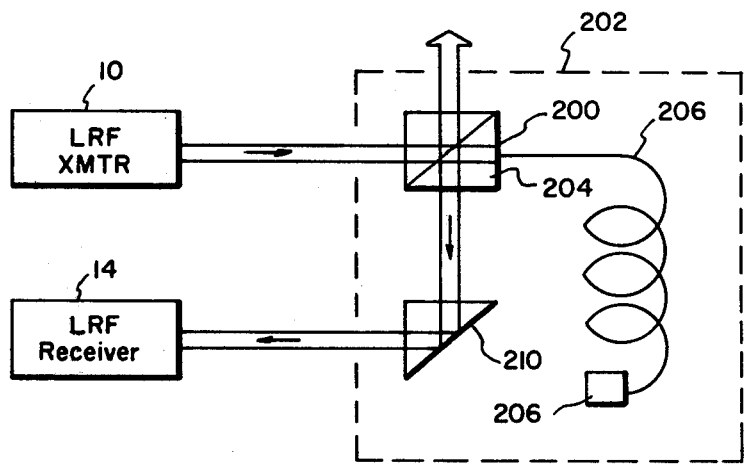
FIG. 9 is a schematic view showing another arrangement of a simulated optical range tester in accordance with the invention that preferably may be utilized as a built-in test unit.

Referring now to FIG. 9, an arrangement in accordance with the concept of the invention preferably being a built-in test unit is illustrated to provide a single range indication at a selected test range. The built-in test range, for example, may be 250 meters, which may be below the minimum range of the laser range finder. If a test range within the active range of the laser range finder is desired to be utilized the test range may be either gated out so as to not appear on the displays or at the output or may be ignored by the operator. The transmitted energy is applied from the transmitter 10 to an energy coupler 200 of a range test unit 202 with the coupler 200 having a dichroic surface 204. A selected or predetermined portion of the transmitted energy is then applied to an input end of a fiber optic line 206 and is transferred to a mirror 208 where it is reflected back through the delay line 206 and in turn through the one-way coupler 200 where the return light is reflected to a prism 210 and into the laser range finder receiver 14. The range test unit 202 thus utilizes approximately half the length of the fiber optic line for the same desired delay. In other arrangements, in accordance with the invention, where a portable test unit is similar to FIG. 9 the test unit may be arranged to be mechanically removed from the point of operation during normal range determination.

The fiber optic lines or optical waveguides that may be utilized in the systems of the invention may operate over any wavelength region that can be provided by construction and is not to be limited to any frequency. Presently commercial fiber optic lines operate in the wavelength region from 300 to 1200 nanometers. The ruby, neodymium, frequency doubled Nd-yag and gallium arsenide lasers all fall within this useful region. The velocity of propagation down the fiber of glass is slower than the speed of light in a vacuum C by a factor depending on the index of refraction of the glass N. In general, the velocity V is equal to C over N and a typical index for glass is 1.5. Therefore the velocity in the fiber is C over 1.5 showing that the light propagates slower in the fiber with the result that the fiber length needs to be only approximately two-thirds of the equivalent length in space. It is to be noted that the fiber line has constant characteristics and is not subject to variations such as found in the atmosphere.

Thus there has been described fiber optic devices to produce multiple delayed light pulses from a single input light pulse for a range test unit that may operate as a portable test unit or as a built-in test unit. In one arrangement, in accordance with the invention, any desired number of ranges may be provided by suitable tapping and positioning of the sampling units. Because the laser range test unit of the invention is a passive device, once installed it has substantially constant and non-variable characteristics.

What is claimed is:

1. A test unit for a laser range finder comprising a laser transmitter and laser receiver, said laser range finder having a signal transmission path and a single signal reception path comprising:

an optical waveguide comprised of a plurality of sequential sections including an input section, each section having ends;

input optical means positioned to direct light energy in said signal transmission path to an input end of said input section;

signal sampling means including a plurality of sampling structures each coupling the corresponding ends of sequential sections to provide gaps of a predetermined length for tapping a portion of the light energy from said optical waveguide, and superposition optical means for directing the sampled light energy to said single signal reception path.

2. The combination of claim 1 further comprising output optical means coupled between the said superposition optical means and said laser receiver; said input optical means including means for transferring light from a source into said optical waveguide for viewing from said laser receiver, said output optical means thus allowing said single signal reception path to be aligned with said sampled light energy.

3. A test unit for a laser range finder responding to a single input energy pulse in a first path and applying delayed energy pulses to a second path comprising:

input optical means responsive to the single input energy pulse in said first path;

an optical fiber line responsive to the energy pulse from said input optical means for delaying said input energy pulse a selected time period, said optical fiber line being comprised of a plurality of sequential sections including a first section, each section having ends, with said first section having a first end positioned to receive at least a portion of said energy pulse from said input optical means;

energy tapping means coupled between the corresponding ends of sequential sections with a predetermined control gap between the ends of each section to pass tapped samples of said energy pulse from said fiber line, said energy tapping means including a plurality of tapping structures mounted on a first side of a flat plate and a plurality of lenses on the other side of said plate positioned to each receive the tapped energy pulse from a different one of said tapping structures, each tapping structure comprising an elongated glass structure having a central axis and an opening therethrough, the sections of said optical fiber positioned in the opening in said glass structure with ends spaced apart to provide a control gap to sample said energy pulse, and a flat mirrored surface at an output end of said tapping structure positioned at an angle relative to said central axis to reflect said tapped energy pulse to a corresponding one of said lenses; and superposition optical means responsive to the delayed energy pulses to apply said delayed energy pulses to said second path.

4. The combination of claim 3 including a capillary tube, said elongated glass structure having an opening therethrough for maintaining said capillary tube therein, said optical fiber being positioned in an opening in said capillary tube with ends spaced to provide said control gap.

5. The test unit of claim 4 further comprising an enclosing structure and a mechanical adapter coupled between said enclosing structure and said laser range finder for aligning said second path to the laser range finder.

6. The combination of claim 3 in which a dichroic mirror is positioned in said first path responsive to a light source to provide an image along said second path for aligning said test unit.

7. A range test device for a range finder having a transmission path and a reception path and displaying a signal received in said reception path comprising:

a fiber optic line having an input section with an input end and an output end and a selected number of sequential other sections each having input and an output end, input optical means coupled between the transmission path and the input end of said input section, multiple sampling means having a plurality of sampling structures, each coupling the input section and the other sections such that the output end of one section is coupled to the input end of another sequential section, each sampling structure having means to provide a gap between the coupled ends to controllably transfer a sampled signal to a common optical path, and output optical means positioned to receive the sampled signals from said common optical path and pass said sampled signals to said reception path.

8. The device of claim 7 having neutral density filter means positioned in said common optical path for attenuating the sampled signals to simulate atmospheric attenuation.

* * * * *